US012698795B2

(12) United States Patent　　　　　(10) Patent No.:　US 12,698,795 B2
Miller et al.　　　　　　　　　　　　(45) Date of Patent:　Aug. 4, 2026

(54) ROTOR SHAFT SYSTEM WITH INCREASED STIFFNESS

(71) Applicant: GM GLOBAL TECHNOLOGY OPERATIONS LLC, Detroit, MI (US)

(72) Inventors: John Miller, Howell, MI (US); Shawn H. Swales, Canton, MI (US); Edward L. Kaiser, Orion, MI (US); Travis M. Thompson, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 329 days.

(21) Appl. No.: 18/502,824

(22) Filed: Nov. 6, 2023

(65) Prior Publication Data

US 2025/0146523 A1　　May 8, 2025

(51) Int. Cl.
| | |
|---|---|
| *H02K 11/21* | (2016.01) |
| *F16C 3/02* | (2006.01) |
| *F16D 1/08* | (2006.01) |
| *H02K 7/00* | (2006.01) |
| *H02K 7/116* | (2006.01) |
| *H02K 1/28* | (2006.01) |

(52) U.S. Cl.
CPC .................. *F16C 3/02* (2013.01); *F16D 1/08* (2013.01); *H02K 7/003* (2013.01); *H02K 7/116* (2013.01); *H02K 11/21* (2016.01); *F16C 2233/00* (2013.01); *F16C 2326/06* (2013.01); *F16D 2300/06* (2013.01); *H02K 1/28* (2013.01)

(58) Field of Classification Search
CPC .... F16C 3/02; F16C 2233/00; F16C 2326/06; F16D 1/08; F16D 2300/06; H02K 7/003; H02K 7/116; H02K 11/21; H02K 1/28

USPC ........................................ 464/7, 23; 310/75 R
See application file for complete search history.

(56) References Cited

U.S. PATENT DOCUMENTS

| | | | | | |
|---|---|---|---|---|---|
| 2,338,093 | A | * | 1/1944 | Caldwell | E21B 3/04 |
| | | | | | 464/7 |
| 4,961,669 | A | * | 10/1990 | Itoh | F16H 57/043 |
| 5,019,733 | A | * | 5/1991 | Kano | H02K 9/19 |
| 2010/0234113 | A1 | * | 9/2010 | Drabek | F16H 57/043 |
| | | | | | 464/7 |

FOREIGN PATENT DOCUMENTS

| | | |
|---|---|---|
| DE | 112017004016 T5 | 5/2019 |
| DE | 102018213609 A1 | 2/2020 |
| DE | 102019207312 A1 | 11/2020 |

OTHER PUBLICATIONS

1. Images of Tesla Model X Front Drive Shaft, known as of 2018.

* cited by examiner

*Primary Examiner* — Greg Binda
(74) *Attorney, Agent, or Firm* — Ingrassia Fisher & Lorenz, LLP | IFL

(57) ABSTRACT

A rotor shaft system for a vehicle includes a rotor shaft having a first shaft end opposite a second shaft end. The rotor shaft has a first segment and a second segment defined between the first shaft end and the second shaft end. The rotor shaft system includes a shaft gear coupled to the rotor shaft between the first shaft end and the first segment, and a shaft sleeve coupled to the first segment so as to surround a portion of the shaft gear. The rotor shaft system includes a lubrication system defined at least partially through the rotor shaft and the shaft sleeve. The lubrication system is to supply a fluid to at least a portion of the rotor shaft and the shaft sleeve.

20 Claims, 6 Drawing Sheets

FIG. 2

ROTOR SHAFT SYSTEM WITH INCREASED STIFFNESS

INTRODUCTION

The technical field generally relates to a propulsion system for a vehicle, and more particularly relates to a propulsion system for a vehicle having a rotor shaft system with increased stiffness.

Generally, a propulsion system of a vehicle, such as a hybrid electric vehicle or an electric vehicle, may comprise an electric motor. The electric motor supplies power to a transmission system, which in turn, transmits the power from the propulsion system to one or more vehicle wheels. In certain examples, it is desirable to increase a speed of the electric motor. In order to increase the speed of the electric motor, a size of a rotor associated with the electric motor may be reduced, which results in a corresponding reduction in size of a rotor shaft associated with the electric motor. The reduction in size of the rotor shaft, however, may result in increased flexibility of the rotor shaft. The increased flexibility of the rotor shaft may lead to decreased lateral stiffness of the rotor shaft, which is undesirable.

Accordingly, it is desirable to provide a rotor shaft system for an electric motor with increased stiffness, which provides a rotor shaft that enables increased speeds for an electric motor without impacting a lateral stiffness of the rotor shaft. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a rotor shaft system for a vehicle. The rotor shaft system includes a rotor shaft having a first shaft end opposite a second shaft end. The rotor shaft has a first segment and a second segment defined between the first shaft end and the second shaft end. The rotor shaft system includes a shaft gear coupled to the rotor shaft between the first shaft end and the first segment, and a shaft sleeve coupled to the first segment so as to surround a portion of the shaft gear. The rotor shaft system includes a lubrication system defined at least partially through the rotor shaft and the shaft sleeve. The lubrication system is configured to supply a fluid to at least a portion of the rotor shaft and the shaft sleeve.

The rotor shaft includes a first shaft bore defined from the first shaft end through the first segment and at least part of the second segment, and the first shaft bore is in fluid communication with the lubrication system. The lubrication system includes a cross-bore defined through the second segment in fluid communication with the first shaft bore. The second segment includes a keyway defined axially on an outer perimeter of the second segment, and the cross-bore is in fluid communication with the keyway. The keyway is configured to couple the rotor shaft to a rotor associated with an electric motor of the vehicle. A lubrication conduit is defined through part of the first segment and the second segment, and is in fluid communication with the keyway. The shaft sleeve includes a sleeve lubrication bore in fluid communication with the lubrication conduit. The shaft sleeve encloses a recessed area defined in the first segment adjacent to the shaft gear. The first segment has a first diameter that is greater than a second diameter of the second segment. The rotor shaft system includes a shaft collar coupled to the second segment proximate the second shaft end. The second segment includes a feed groove, and the shaft collar includes at least one opening in fluid communication with the feed groove.

Also provided according to various embodiments is a vehicle. The vehicle includes an electric motor including a rotor, and a rotor shaft system coupled to the electric motor. The rotor shaft system includes a rotor shaft having a first shaft end opposite a second shaft end. The rotor shaft has a first segment and a second segment defined between the first shaft end and the second shaft end. The second segment is coupled to the rotor. The rotor shaft system includes a shaft gear defined on the rotor shaft between the first shaft end and the first segment. The rotor shaft system includes a shaft sleeve coupled to the first segment so as to be disposed between the shaft gear and the rotor, and the shaft sleeve surrounds a portion of the shaft gear. The rotor shaft system includes a shaft collar coupled to the second segment between the rotor and the second shaft end, and the shaft collar is configured to clamp the rotor and the shaft sleeve to the rotor shaft. The rotor shaft system includes a lubrication system defined through a portion of the rotor shaft and the shaft sleeve. The lubrication system is configured to supply a fluid to at least the portion of the rotor shaft, the shaft sleeve and the electric motor.

The rotor shaft includes a first shaft bore defined to extend from the first shaft end through the first segment and at least part of the second segment, and the first shaft bore is in fluid communication with the lubrication system. The lubrication system includes a cross-bore defined through the second segment in fluid communication with the first shaft bore. The second segment includes a keyway defined axially on an outer perimeter of the second segment, the keyway coupled to a key associated with the rotor, and the cross-bore is in fluid communication with the keyway. A lubrication conduit is defined through part of the first segment and the second segment, and the lubrication conduit in fluid communication with the keyway. The shaft sleeve includes a sleeve lubrication bore, and the sleeve lubrication bore is in fluid communication with the lubrication conduit. The shaft sleeve encloses a recessed area defined in the first segment adjacent to the shaft gear. The first segment has a first diameter that is greater than a second diameter of the second segment. The second segment includes a feed groove, and the shaft collar includes at least one opening in fluid communication with the feed groove. The vehicle includes a sensor coupled to a second shaft bore at the second shaft end and the second shaft bore extends axially toward the second segment.

BRIEF DESCRIPTION OF THE DRAWINGS

The exemplary embodiments will hereinafter be described in conjunction with the following drawing figures, wherein like numerals denote like elements, and wherein:

FIG. 2 is a front perspective view of the rotor shaft system coupled to an electric motor associated with a propulsion system of the vehicle in accordance with various embodiments;

DETAILED DESCRIPTION

Figure 1:
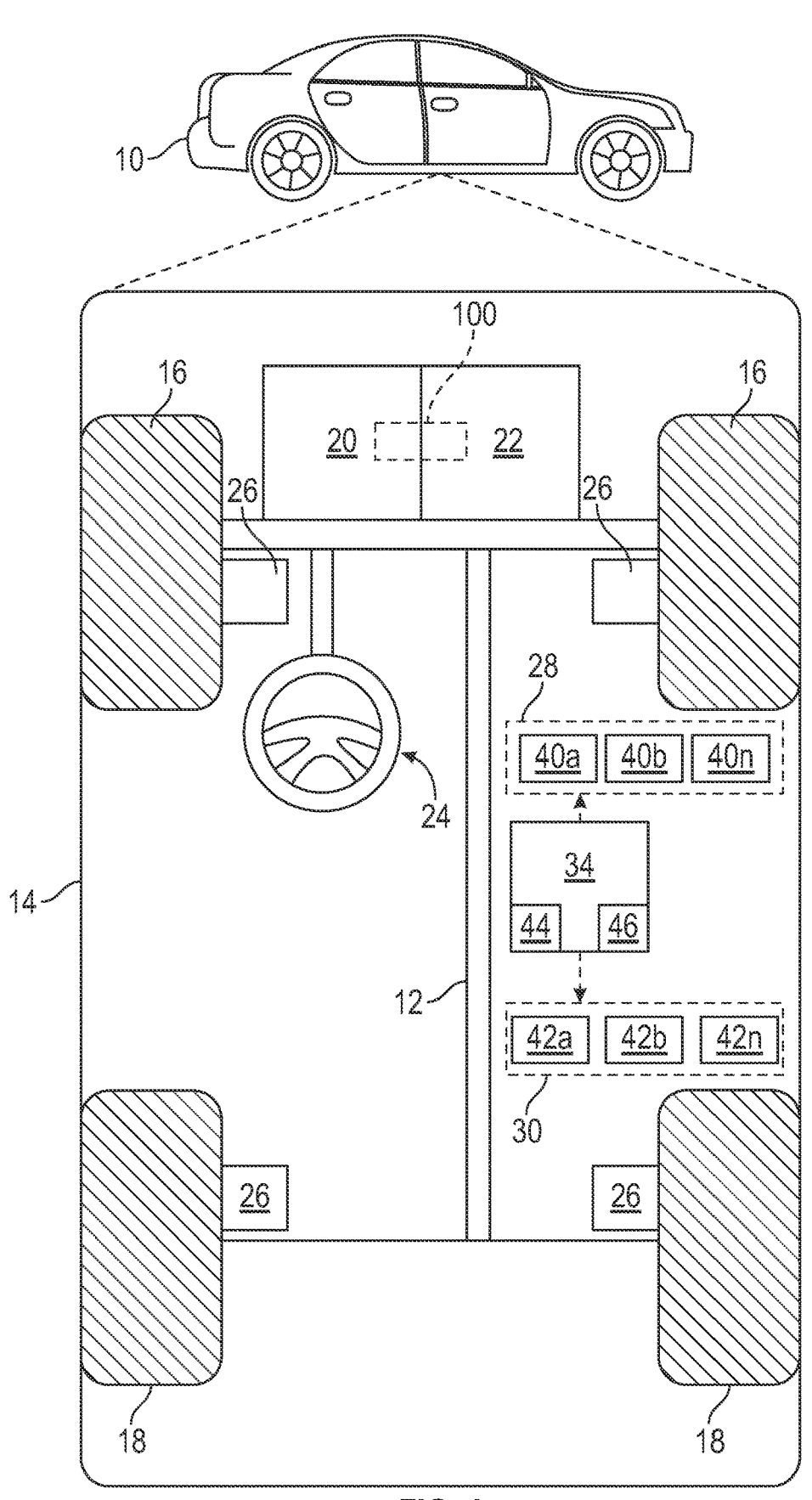
FIG. 1 is a functional block diagram illustrating a vehicle including a rotor shaft system with increased stiffness in accordance with various embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a rotor shaft system having increased stiffness shown generally as 100 is associated with a vehicle 10 in accordance with various embodiments. In one example, the vehicle 10 is a battery electric vehicle, however, it should be understood that the following disclosure may be applicable to other electric motor driven devices. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. In various embodiments, the vehicle 10 is an autonomous vehicle or a semi-autonomous vehicle. As can be appreciated, the rotor shaft system 100 can be implemented in other non-autonomous systems and is not limited to the present embodiments. The vehicle 10 is depicted in the illustrated embodiment as a battery electric passenger car, but it should be appreciated that any other vehicle, including motorcycles, trucks, sport utility vehicles (SUVs), recreational vehicles (RVs), etc., can also be used.

As shown, the vehicle 10 generally includes a propulsion system 20, a transmission system 22, a steering system 24, a brake system 26, a sensor system 28, an actuator system 30 and at least one controller 34. The propulsion system 20 may, in various embodiments, include an electric machine such as an electric motor. The propulsion system 20 is coupled to the rotor shaft system 100, which is coupled to the transmission system 22. The transmission system 22 is configured to transmit power from the propulsion system 20 received via the rotor shaft system 100 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 24a for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. In one example, the sensing devices 40a-40n may include a shaft speed sensor 40a, which is coupled to the rotor shaft system 100 and configured to generate sensor signals based on a speed of a rotor shaft 102 associated with the rotor shaft system 100. The sensor system 28 is in communication with the controller 34 over a communication medium.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, active safety seat or haptic seat, and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

Figure 2:
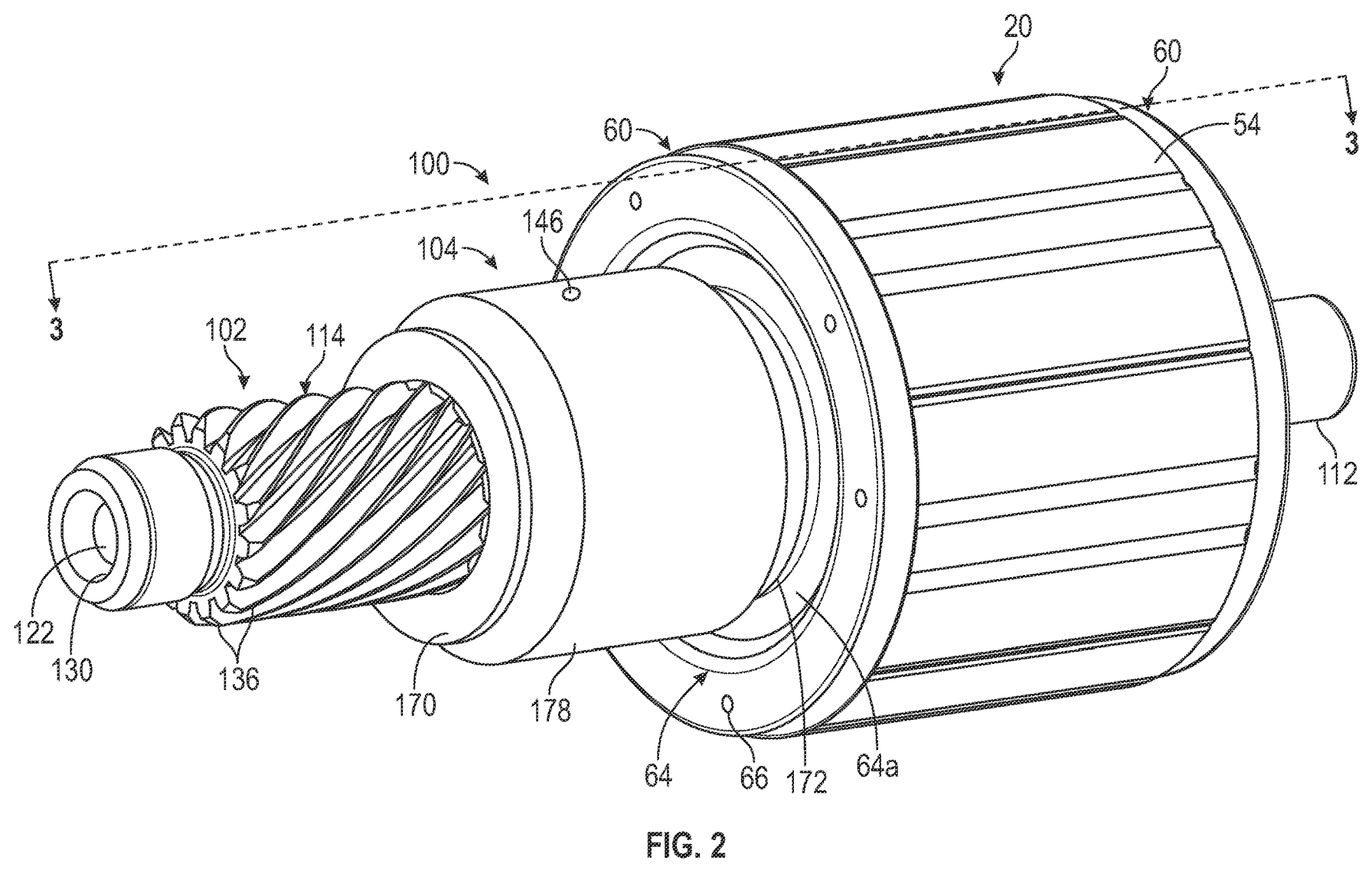

With reference to FIG. 2, the propulsion system 20 and the rotor shaft system 100 are shown in greater detail. As discussed, in this example, the propulsion system 20 is an electric motor 50 and it may have any suitable configuration for use with the vehicle 10. Briefly, with reference to FIG. 3, the electric motor 50 includes a rotor 52 and a stator 54. The stator 54 surrounds the rotor 52 and includes two or more conductors that create a magnetic field to rotate the rotor 52. The rotor 52 includes one or more magnets or conductors, which also create a magnetic field. The rotor shaft system 100 is coupled to the rotor 52 and rotates with the rotor 52. The rotor shaft system 100 may be supported for rotation by one or more bearings (not shown). The electric motor 50 may be contained between a pair of motor end rings 60, and the output shaft 56 may extend outwardly from each of the motor end rings 60.

Figure 4:
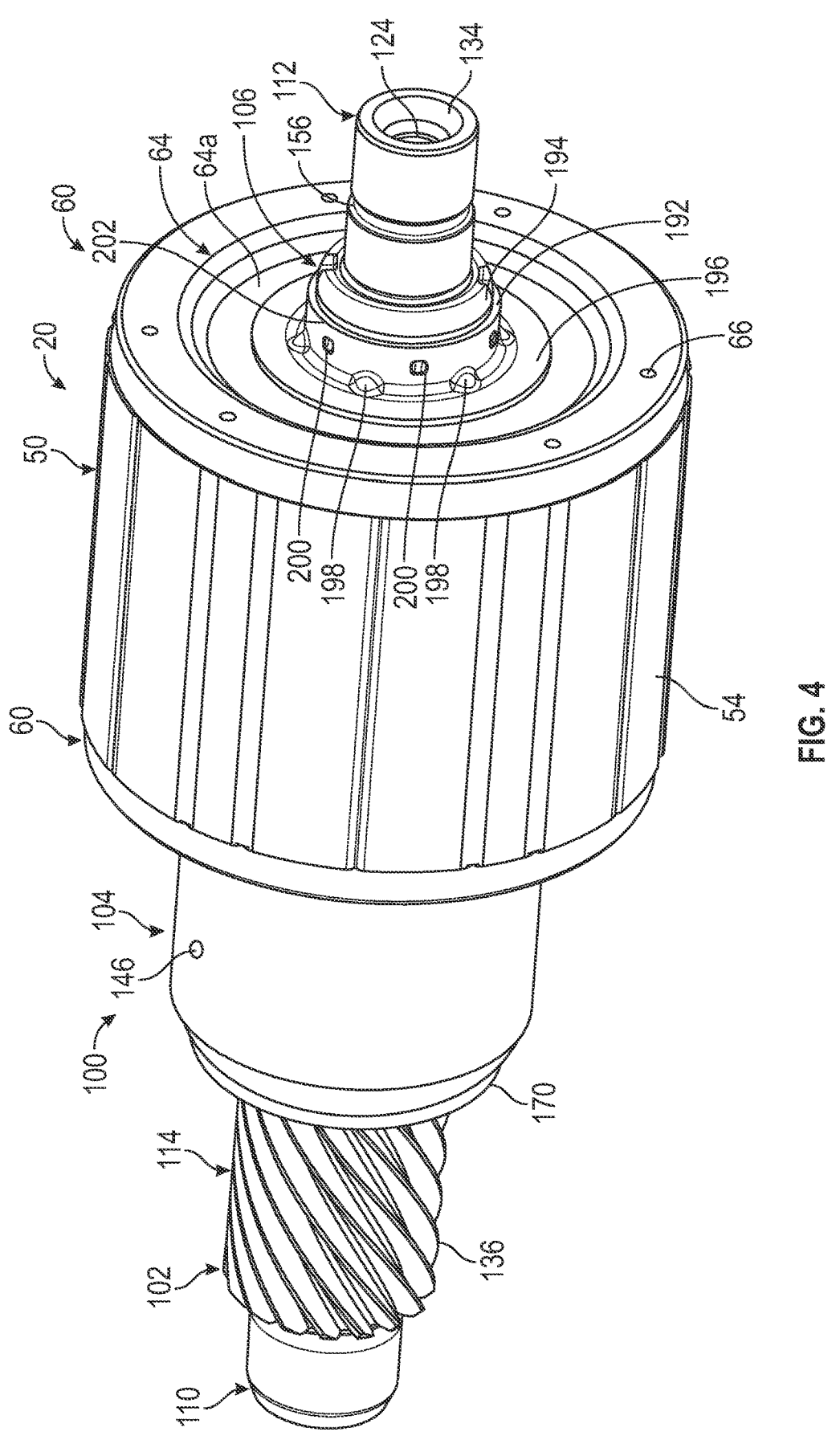
FIG. 4 is a back perspective view of the rotor shaft system coupled to the electric motor in accordance with various embodiments.
Figure 5:
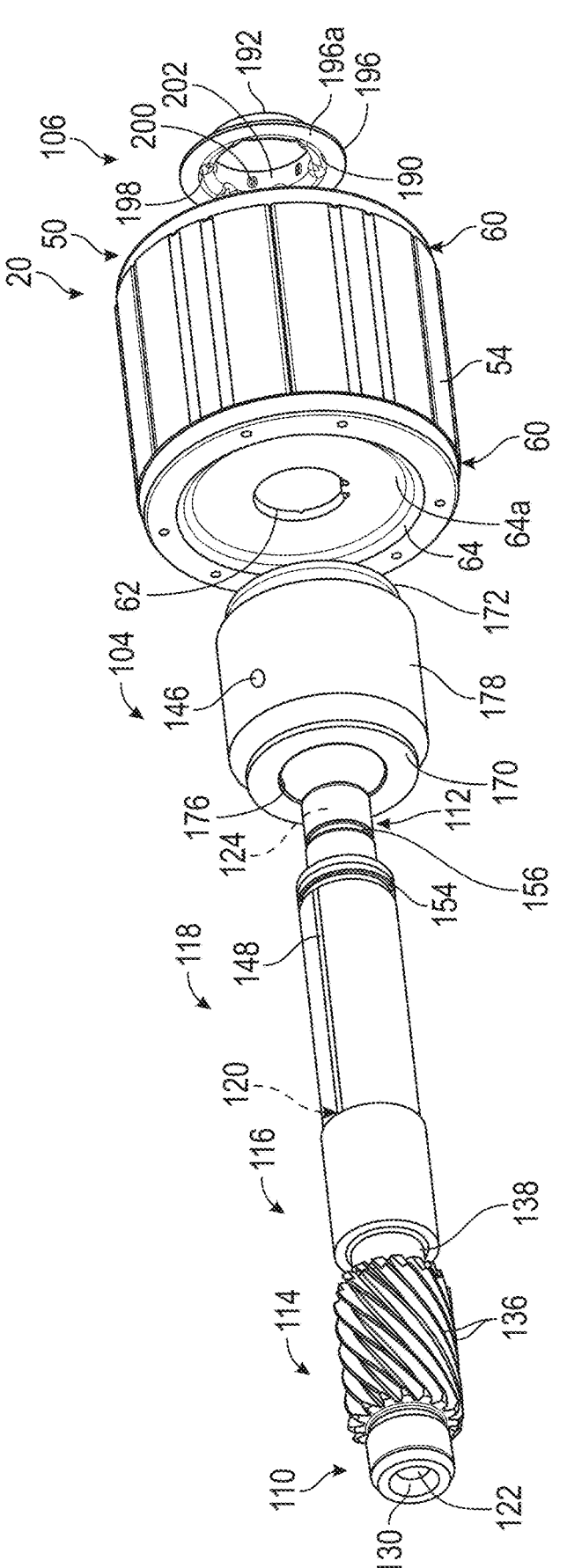
FIG. 5 is an exploded view of the rotor shaft system and the electric motor in accordance with various embodiments.

In this example, each of the motor end rings 60 is annular, and each of the motor end rings 60 is substantially mirror symmetric relative to an axis that is perpendicular to a longitudinal axis L of the rotor shaft system 100. Each of the motor end rings 60 defines a central bore 62, and includes a countersunk region 64 defined about the central bore 62. The central bore 62 is sized to receive a portion of the rotor shaft system 100 therethrough. The countersunk region 64 extends radially about the central bore 62. The countersunk region 64 provides a contact surface 64a for coupling the rotor shaft system 100 to the propulsion system 20. With reference back to FIGS. 2 and 4, each of the motor end rings 60 may also include one or a plurality of openings 66 defined about a perimeter or circumference of the respective motor end rings 60, spaced apart from the countersunk region 64, which receives a respective mechanical fastener, such as a bolt, screw, etc. to couple each of the motor end rings 60 to the stator 54.

Figure 3:
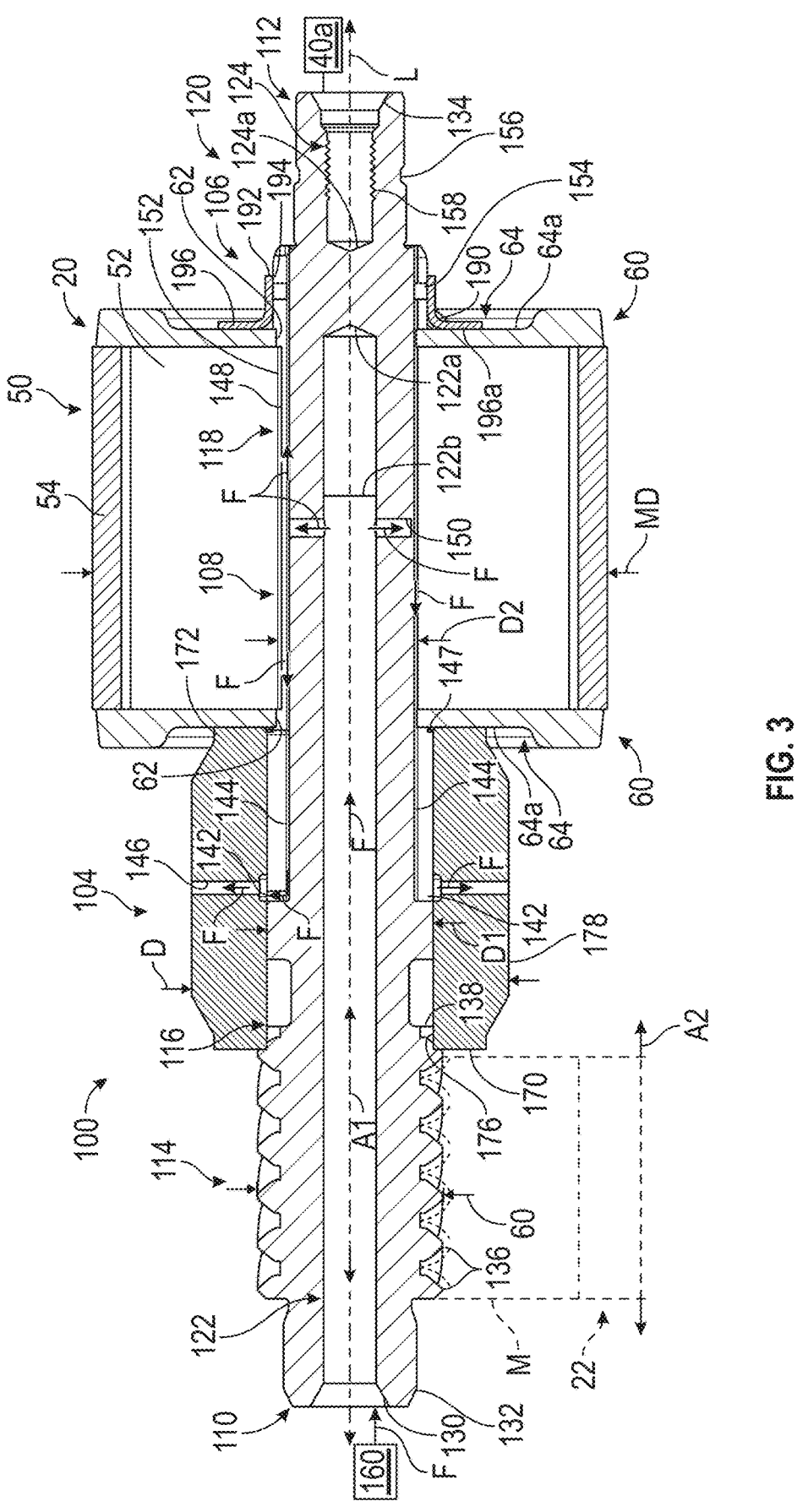
FIG. 3 is a cross-sectional view of the rotor shaft system and the electric motor, taken along line 3-3 of FIG. 2.

In one example, the rotor shaft system 100 includes the rotor shaft 102, a shaft sleeve 104, a shaft collar 106 (FIG. 4) and a lubrication system 108. The rotor shaft 102 is composed of a metal or metal alloy, and is cast, forged, extruded, additively manufactured, etc. The rotor shaft 102 is substantially cylindrical, and extends along the longitudinal axis L. The longitudinal axis L is also an axis of rotation of the rotor shaft 102. The rotor shaft 102 includes a first shaft end 110 opposite a second shaft end 112, a shaft gear 114, a first segment or sleeve segment 116, a second segment or rotor segment 118 and a third segment or coupling segment 120. The rotor shaft 102 also defines a first shaft bore 122 and a second shaft bore 124. With reference to FIG. 3, the first shaft end 110 defines a first countersink 130, which is in communication with the first shaft bore 122. The first shaft end 110 also includes a chamfer 132, which extends axially from the first shaft end 110. The first shaft end 110 may be coupled to a bearing, such as a ball bearing (not shown), which supports the rotor shaft 102 for rotation. The second shaft end 112 defines a second countersink 134, which is in communication with the second shaft bore 124.

The shaft gear 114 is defined on the rotor shaft 102 by machining with a lathe, for example. The shaft gear 114 is a pinion gear having a plurality of gear teeth 136. In this example, the shaft gear 114 is a helical pinion gear with a plurality of helical gear teeth. It should be noted that the shaft gear 114 may be formed on the rotor shaft 102 as desired to mate with the transmission system 22. For example, the shaft gear 114 may be defined as a spur gear with a plurality of spur gear teeth, a bevel gear with a plurality of bevel gear teeth, etc. Generally, the shaft gear 114 is coupled to or meshingly engages with a mating gear M of the transmission system 22 to transfer torque from the propulsion system 20 to the transmission system 22 (FIG. 3). The shaft gear 114 may have any number of gear teeth 136 to couple to the transmission system 22 to drive the transmission system 22, and thus, the number of gear teeth 136 illustrated herein is merely an example. The shaft gear 114 is defined on the rotor shaft 102 between the first shaft end 110 and the sleeve segment 116. In one example, the shaft gear 114 has a gear diameter GD, and the gear diameter GD is about 41 millimeters (mm) to about 42 millimeters (mm).

The sleeve segment 116 is defined on the rotor shaft 102 directly adjacent to the shaft gear 114. The sleeve segment 116 is defined between the shaft gear 114 and the rotor segment 118. Generally, the shaft sleeve 104 is coupled to the rotor shaft 102 so as to be positioned over and coupled to the sleeve segment 116. The sleeve segment 116 includes a recessed area 138, a lubrication groove 142 and a portion of a lubrication conduit 144. The recessed area 138 is defined proximate or adjacent to the shaft gear 114. The recessed area 138 enables debris, such as metal shavings, etc. produced during the formation of the shaft gear 114 to be removed from the rotor shaft 102. Stated another way, the recessed area 138 serves as a clean out area. A remainder of the sleeve segment 116 has a first diameter that is sized and shaped to couple the shaft sleeve 104 to the rotor shaft 102. In one example, the first diameter D1 is about 38.5 millimeters (mm) to about 40.5 millimeters (mm). The remainder of the sleeve segment 116 extends axially for a distance to enable alignment between the lubrication groove 142 and a sleeve lubrication bore 146. The lubrication groove 142 is coupled to and in fluid communication with the sleeve lubrication bore 146 and the lubrication conduit 144. The lubrication groove 142 is defined along an axis that is substantially perpendicular to the longitudinal axis L or is defined radially relative to the rotor shaft 102. As will be discussed, the lubrication groove 142 directs a fluid F, such as a lubricating fluid and/or a cooling fluid, for example, oil, to the sleeve lubrication bore 146 of the shaft sleeve 104. As will be discussed, the lubrication conduit 144 extends along the rotor shaft 102 from lubrication groove 142 of the sleeve segment 116 to proximate the second shaft end 112. The lubrication conduit 144 is coupled to or in fluid communication with the lubrication groove 142 to supply or direct the fluid F into the lubrication groove 142.

The rotor segment 118 is defined to extend from the sleeve segment 116 to the coupling segment 120. The rotor segment 118 has a second diameter D2, which is different and less than the first diameter D1 of the sleeve segment 116. A shoulder 147 is defined between the step or change in the diameter of the rotor shaft 102 from the sleeve segment 116 to the rotor segment 118. In one example, the second diameter D2 is about 36 millimeters (mm) to about 38 millimeters (mm). The rotor segment 118 is coupled to the rotor 52 of the electric motor 50. In this example, the rotor segment 118 includes a keyway 148 and a cross-bore 150. The keyway 148 is defined to extend axially along an exterior surface or perimeter of the rotor segment 118, and cooperates with a key 152 defined on the rotor 52. The cooperation between the keyway 148 and the key 152 couples the rotor shaft 102 to the rotor 52 to enable torque transfer between the rotor 52 and the rotor shaft 102. The key 152 is shown in the keyway 148 in FIG. 3. Thus, generally, the rotor segment 118 is coupled to the rotor 52 so as to be driven by the rotor 52. The shaft sleeve 104 and the shaft collar 106 may also assist in coupling the rotor shaft 102 to the rotor 52 along the rotor segment 118. The cross-bore 150 is defined to be substantially equidistant from the pair of motor end rings 60. The cross-bore 150 is substantially cylindrical and extends along an axis, which is substantially perpendicular to the longitudinal axis L. The cross-bore 150 is in fluid communication with or is fluidly coupled to the first shaft bore 122 to receive the fluid F, and the cross-bore 150 is in fluid communication with or is fluidly coupled to the lubrication conduit 144 to direct the fluid F into the lubrication conduit 144. The cross-bore 150 is also in fluid communication with the keyway 148 to supply the fluid F to the keyway 148.

In one example, the rotor segment 118 also includes a feed groove 154. The feed groove 154 is defined about an outer perimeter or circumference of the rotor segment 118 proximate the coupling segment 120. The feed groove 154 is in fluid communication or is fluidly coupled to the keyway 148 to receive the fluid F from the keyway 148. The feed groove 154 provides or supplies the fluid F to the motor end ring 60 proximate the second shaft end 112 and to the shaft collar 106.

The coupling segment 120 is defined between the rotor segment 118 and the second shaft end 112. In one example, the coupling segment 120 has a third diameter, which is different and less than the second diameter D2 of the rotor segment 118. The coupling segment 120 is sized to receive a bearing, such as a ball bearing. The coupling segment 120 in this example includes a coupling groove 156. The coupling groove 156 is sized and shaped to assist in coupling the bearing to the rotor shaft 102 to support the rotor shaft 102 for rotation. The coupling groove 156 is defined substantially equidistant between the rotor segment 118 and the second shaft end 112.

The first shaft bore 122 is defined through the first shaft end 110 to extend from the first shaft end 110 through the sleeve segment 116 and a portion of the rotor segment 118. The first shaft bore 122 generally extends through the rotor segment 118 such that an internal end 122a of the first shaft bore 122 is substantially coplanar with the motor end ring 60 that is proximate the second shaft end 112. The first shaft bore 122 is separate and discrete from the second shaft bore 124. The first shaft bore 122 is fluidly coupled to or in fluid communication with a source 160 of the fluid F, and provides the first shaft bore 122 with the fluid F. In one example, the first shaft bore 122 includes a ledge 122b, which is defined downstream of the cross-bore 150. The ledge 122b is a step up or reduction in the inner diameter of the first shaft bore 122, which assists in moving the fluid F through the first shaft bore 122.

The second shaft bore 124 is defined through the second shaft end 112 to extend from the second shaft end 112 to an internal end 124a defined within the coupling segment 120 adjacent to the rotor segment 118. The second shaft bore 124 defines a plurality of internal threads 158. The internal threads 158 couple to or matingly engage with a mechanical fastener, such as a clamp bolt, which may be used to couple the shaft speed sensor 40a of the sensor system 28 to the rotor shaft 102.

The shaft sleeve 104 surrounds the sleeve segment 116 of the rotor shaft 102. The shaft sleeve 104 is composed of a metal or metal alloy, and is cast, forged, additively manufactured, etc. The shaft sleeve 104 is substantially cylindrical, and has a first sleeve end 170 opposite a second sleeve end 172. The shaft sleeve 104 also defines the sleeve lubrication bore 146 and a central shaft bore 176. The central shaft bore 176 extends axially from the first sleeve end 170 to the second sleeve end 172, and is sized to enable the shaft sleeve 104 to be coupled to the sleeve segment 116. In one example, the shaft sleeve 104 is coupled to the sleeve segment 116 by a press-fit or shrink-fit. The first sleeve end 170 and the second sleeve end 172 each have a diameter that is different and less than a sleeve diameter of a body 178 of the shaft sleeve 104 defined between the first sleeve end 170 and the second sleeve end 172. Generally, the sleeve diameter D is sized to improve a lateral stiffness of the rotor shaft 102, and is greater than the gear diameter GD associated with the shaft gear 114. In one example, the sleeve diameter D is equal to or less than a motor diameter MD associated with the electric motor 50. The lateral stiffness of the rotor shaft 102 is a resistance to deflection or bending of the rotor shaft 102 along the longitudinal axis L. By improving the lateral stiffness of the rotor shaft 102, the shaft sleeve 104 assists in maintaining the shaft gear 114 in a substantially parallel relationship with the mating gear M of the transmission system 22, which ensures efficient torque transfer from the rotor shaft 102 to the transmission system 22. Stated another way, the improved lateral stiffness maintains a central axis A1 defined through the shaft gear 114 substantially coaxial with the longitudinal axis L, which ensures that the central axis A1 of the shaft gear 114 is substantially parallel to a central axis A2 of the mating gear M of the transmission system 22. In one example, the improved lateral stiffness of the rotor shaft 102 reduces the misalignment of the shaft gear 114 and the mating gear M or misalignment line of action (MLOA) by a factor of 2 to 3. It should be noted that the sleeve diameter D is merely an example, as the sleeve diameter D may be increased or decreased to impart a predetermined amount of lateral stiffness to the rotor shaft 102 to maintain a substantially parallel relationship between the shaft gear 114 and the mating gear M of the transmission system 22.

The first sleeve end 170 is coupled to the rotor shaft 102 so as to be positioned about and over a portion of the gear teeth 136 of the shaft gear 114. Thus, in this example, the shaft sleeve 104 overlaps, surrounds, or encloses the recessed area 138 of the sleeve segment 116. The first sleeve end 170 is coupled to the rotor shaft 102 about the gear teeth 136 so as to not interfere with the coupling of the gear teeth 136 to the transmission system 22. The second sleeve end 172 is coupled to and in contact with the motor end ring 60 that is proximate the sleeve segment 116. The second sleeve end 172 also overlaps or surrounds the shoulder 147 defined by the difference in diameters between the sleeve segment 116 and the rotor segment 118. Generally, the shaft sleeve 104 is retained on the rotor sleeve segment via the press-fit or shrink-fit, and is inhibited from axial movement due to the shaft gear 114 and the adjacent motor end ring 60.

The sleeve lubrication bore 146 is a cross-bore defined through the body 178 of the shaft sleeve 104. The sleeve lubrication bore 146 is fluidly coupled to or in fluid communication with the lubrication groove 142. The sleeve lubrication bore 146 receives the fluid F from the lubrication groove 142 and directs the fluid F radially outward, where the fluid F may flow onto an exterior surface of the shaft sleeve 104 and onto the adjacent motor end ring 60.

The shaft collar 106 assists in retaining the electric motor 50 on the rotor shaft 102. In one example, the shaft collar 106 is substantially L-shaped in cross-section. The shaft collar 106 is composed of a metal or metal alloy, and is cast, stamped, additively manufactured, etc. The shaft collar 106 includes a first collar end 190 opposite a second collar end 192, and defines a central collar bore 194 that extends from the first collar end 190 to the second collar end 192. The first collar end 190 includes a flange 196, which extends radially outward from the first collar end 190. The flange 196 includes a coupling surface 196a, which is coupled to the motor end ring 60 proximate the second shaft end 112. In one example, with reference to FIG. 4, the shaft collar 106 is coupled to the motor end ring 60 by swaging. The flange 196 defines a plurality of dimples 198 at an intersection between the flange 196 and a collar body 202 of the shaft collar 106. The collar body 202 is defined between the first collar end 190 and the second collar end 192. The dimples 198 engage with a groove defined on the motor end ring 60 proximate the second shaft end 112 to assist in coupling the shaft collar 106 to the electric motor 50. It should be noted that other techniques may be used to couple the shaft collar 106 to the rotor shaft 102.

The second collar end 192 is positioned adjacent to the coupling segment 120 when the shaft collar 106 is coupled to the rotor shaft 102. The central collar bore 194 is sized to receive the rotor shaft 102 and is coupled to the rotor shaft 102 to rotate with the rotor shaft 102. The shaft collar 106 also defines a plurality of openings 200. The openings 200 are defined through the collar body 202 so as to be spaced apart about a perimeter of the collar body 202. The openings 200 are fluidly coupled to or in fluid communication with the feed groove 154 to receive the fluid F from the keyway 148 (FIG. 3).

With reference to FIG. 3, the lubrication system 108 is in fluid communication with or fluidly coupled to the source 160 of the fluid F via one or more conduits, hydraulic couplings, etc. The source 160 may comprise a reservoir that contains the fluid F associated with the vehicle 10 (FIG. 1), such as an oil reservoir, which may include a pump or the like to deliver the fluid F to the rotor shaft 102. In one example, the lubrication system 108 includes the first shaft bore 122, the cross-bore 150 defined in the rotor segment 118, the lubrication conduit 144 defined in the rotor segment 118 and the sleeve segment 116, the lubrication groove 142 defined in the sleeve segment 116, the sleeve lubrication bore 146 defined in the shaft sleeve 104, the feed groove 154 defined in the rotor segment 118 and the openings 200 of the shaft collar 106.

Generally, the fluid F is supplied by the source 160 to the first shaft bore 122. From the first shaft bore 122, the fluid F flows to the cross-bore 150. From the cross-bore 150, the fluid F flows through the keyway 148 to the feed groove 154. From the feed groove 154, the fluid F flows through the openings 200 of the collar to lubricate the bearing coupled to the coupling segment 120.

From the cross-bore 150, the fluid F also flows along the keyway 148 and/or lubrication conduit 144 into the portion of the lubrication conduit 144 defined in the sleeve segment 116. The fluid F flows from the lubrication conduit 144 into the lubrication groove 142, and from the lubrication groove 142 into the sleeve lubrication bore 146. From the sleeve lubrication bore 146, the fluid F flows over the outer surface of the body 178 and onto the motor end ring 60 proximate the shaft sleeve 104. By providing the rotor shaft system 100 with the lubrication system 108, the rotor shaft 102 and the electric motor 50 may be lubricated and/or cooled without requiring additional components.

It should be noted that while the rotor shaft 102 is described herein as including the shaft gear 114 with the recessed area 138, the rotor shaft 102 may be configured differently to improve the lateral thickness of the rotor shaft 102. In one example, with reference to FIG. 6, a rotor shaft system 300 is shown, which may be coupled to the rotor 52 and rotates with the rotor 52. As the rotor shaft system 300 includes components that are the same or similar to components of the rotor shaft system 100 discussed with regard to FIGS. 1-5, the same reference numerals will be used to denote the same or similar components. In one example, the rotor shaft system 300 includes a rotor shaft 302, the shaft sleeve 104, the shaft collar 106 and the lubrication system 108. The rotor shaft 302 is composed of a metal or metal alloy, and is cast, forged, extruded, additively manufactured, etc. The rotor shaft 302 is substantially cylindrical, and extends along the longitudinal axis L. The longitudinal axis L is also an axis of rotation of the rotor shaft 302. The rotor shaft 302 includes the first shaft end 110 opposite the second shaft end 112, a shaft gear 314, a first segment or sleeve segment 316, the second segment or rotor segment 118 and the third segment or coupling segment 120. The rotor shaft 302 also defines the first shaft bore 122 and the second shaft bore 124. The first shaft end 110 defines the first countersink 130, which is in communication with the first shaft bore 122. The first shaft end 110 also includes the chamfer 132. The first shaft end 110 may be coupled to a bearing, such as a ball bearing (not shown), which supports the rotor shaft 302 for rotation. The second shaft end 112 defines the second countersink 134, which is in communication with the second shaft bore 124.

The shaft gear 314 is defined on the rotor shaft 302 by machining with a lathe, for example. The shaft gear 314 is a pinion gear having a plurality of gear teeth 336. In this example, the shaft gear 314 is a helical pinion gear with a plurality of helical gear teeth. It should be noted that the shaft gear 314 may be formed on the rotor shaft 302 as desired to mate with the transmission system 22 (FIG. 1). For example, the shaft gear 314 may be defined as a spur gear with a plurality of spur gear teeth, a bevel gear with a plurality of bevel gear teeth, etc. Generally, the shaft gear 314 is coupled to or meshingly engages with the mating gear M of the transmission system 22 to transfer torque from the propulsion system 20 to the transmission system 22 (FIG. 3). The shaft gear 314 may have any number of gear teeth 336 to couple to the transmission system 22 to drive the transmission system 22, and thus, the number of gear teeth 336 illustrated herein is merely an example. The shaft gear 314 is defined on the rotor shaft 302 between the first shaft end 110 and the sleeve segment 316. In one example, the shaft gear 314 has a gear diameter GD, and the gear diameter GD is about 41 millimeters (mm) to about 42 millimeters (mm).

The sleeve segment 316 is defined on the rotor shaft 302 directly adjacent to the shaft gear 314. The sleeve segment 316 is defined between the shaft gear 314 and the rotor segment 118. Generally, the shaft sleeve 104 is coupled to the rotor shaft 302 so as to be positioned over and coupled to the sleeve segment 316. The sleeve segment 316 includes a sweep out area 338, the lubrication groove 142 and the portion of a lubrication conduit 144. The sweep out area 338 is defined during the forming of the shaft gear 314. The sweep out area 338 generally comprises shorter depth gear teeth 336, which are defined as the lathe is used to form the shaft gear 314. A remainder of the sleeve segment 316 has the first diameter D1 that is sized and shaped to couple the shaft sleeve 104 to the rotor shaft 302. The remainder of the sleeve segment 116 extends axially for a distance to enable alignment between the lubrication groove 142 and the sleeve lubrication bore 146. The lubrication groove 142 is coupled to and in fluid communication with the sleeve lubrication bore 146 and the lubrication conduit 144. The lubrication conduit 144 is coupled to or in fluid communication with the lubrication groove 142 to supply or direct the fluid F into the lubrication groove 142.

The rotor segment 118 is defined to extend from the sleeve segment 316 to the coupling segment 120. The rotor segment 118 has the second diameter D2, which is different and less than the first diameter D1 of the sleeve segment 116. The shoulder 147 is defined between the step or change in the diameter of the rotor shaft 302 from the sleeve segment 316 to the rotor segment 118. The rotor segment 118 is coupled to the rotor 52 of the electric motor 50. The rotor segment 118 includes the keyway 148 (shown in FIG. 3) and the cross-bore 150. The key 152 is shown in the keyway 148 in FIG. 3. The rotor segment 118 is coupled to the rotor 52 so as to be driven by the rotor 52. The shaft sleeve 104 and the shaft collar 106 may also assist in coupling the rotor shaft 302 to the rotor 52 along the rotor segment 118. The cross-bore 150 is in fluid communication with or is fluidly coupled to the first shaft bore 122 to receive the fluid F, and the cross-bore 150 is in fluid communication with or is fluidly coupled to the lubrication conduit 144 to direct the fluid F into the lubrication conduit 144. The cross-bore 150 is also in fluid communication with the keyway 148 (FIG. 3) to supply the fluid F to the keyway 148. In one example, the rotor segment 118 also includes the feed groove 154. The feed groove 154 is in fluid communication or is fluidly coupled to the keyway 148 (FIG. 3) to receive the fluid F from the keyway 148. The feed groove 154 provides or supplies the fluid F to the motor end ring 60 proximate the second shaft end 112 and to the shaft collar 106.

The coupling segment 120 is defined between the rotor segment 118 and the second shaft end 112. The coupling segment 120 includes the coupling groove 156 that is sized and shaped to assist in coupling the bearing to the rotor shaft 302 to support the rotor shaft 302 for rotation.

The first shaft bore 122 is defined through the first shaft end 110 to extend from the first shaft end 110 through the sleeve segment 316 and a portion of the rotor segment 118. The first shaft bore 122 is fluidly coupled to or in fluid communication with the source 160 of the fluid F, and provides the first shaft bore 122 with the fluid F. In one example, the first shaft bore 122 includes the step or ledge 122*b*, which is defined downstream of the cross-bore 150.

The second shaft bore 124 is defined through the second shaft end 112 to extend from the second shaft end 112 to the internal end 124*a*. The second shaft bore 124 defines the internal threads 158, which may be used to couple the shaft speed sensor 40*a* of the sensor system 28 to the rotor shaft 302.

The shaft sleeve 104 surrounds the sleeve segment 316 of the rotor shaft 302. The central shaft bore 176 extends axially from the first sleeve end 170 to the second sleeve end 172, and is sized to enable the shaft sleeve 104 to be coupled to the sleeve segment 316. In one example, the shaft sleeve 104 is coupled to the sleeve segment 316 by a press-fit or shrink-fit. The first sleeve end 170 and the second sleeve end 172 each have a diameter that is different and less than the sleeve diameter D of a body 178 of the shaft sleeve 104 defined between the first sleeve end 170 and the second sleeve end 172. The sleeve diameter D is sized to improve a lateral stiffness of the rotor shaft 302, and is greater than the gear diameter GD associated with the shaft gear 114. In one example, the sleeve diameter D is equal to or less than the motor diameter MD associated with the electric motor 50. By improving the lateral stiffness of the rotor shaft 302, the shaft sleeve 104 assists in maintaining the shaft gear 314 in a substantially parallel relationship with the mating gear M of the transmission system 22, which ensures efficient torque transfer from the rotor shaft 302 to the transmission system 22.

The first sleeve end 170 is coupled to the rotor shaft 302 so as to be positioned about and over a portion of the gear teeth 336 of the shaft gear 314. Thus, in this example, the shaft sleeve 104 overlaps, surrounds, or encloses the sweep out area 338 of the sleeve segment 316. The first sleeve end 170 is coupled to the rotor shaft 302 about the gear teeth 336 so as to not interfere with the coupling of the gear teeth 336 to the transmission system 22 and to assist in clamping the electric motor 50 to the rotor shaft 302. The second sleeve end 172 is coupled to and in contact with the motor end ring 60 that is proximate the sleeve segment 316. The second sleeve end 172 also overlaps or surrounds the shoulder 147 defined by the difference in diameters between the sleeve segment 316 and the rotor segment 118. Generally, the shaft sleeve 104 is retained on the rotor sleeve segment via the press-fit or shrink-fit, and is inhibited from axial movement due to the shaft gear 314 and the adjacent motor end ring 60. The sleeve lubrication bore 146 is fluidly coupled to or in fluid communication with the lubrication groove 142.

The shaft collar 106 assists in retaining the electric motor 50 on the rotor shaft 302. The shaft collar 106 includes the first collar end 190 opposite the second collar end 192, and defines the central collar bore 194. The first collar end 190 includes the flange 196, which includes the coupling surface 196a that is coupled to the motor end ring 60 to couple the second shaft end 112. The shaft collar 106 is coupled to the motor end ring 60 by swaging. The flange 196 defines the plurality of dimples 198, which engage with the groove defined on the motor end ring 60 proximate the second shaft end 112 to assist in coupling the shaft collar 106 to the electric motor 50. It should be noted that other techniques may be used to couple the shaft collar 106 to the rotor shaft 302.

The second collar end 192 is positioned adjacent to the coupling segment 120 when the shaft collar 106 is coupled to the rotor shaft 302. The central collar bore 194 is sized to receive the rotor shaft 302 and is coupled to the rotor shaft 302 to rotate with the rotor shaft 302. The shaft collar 106 also defines the plurality of openings 200, which are fluidly coupled to or in fluid communication with the feed groove 154 to receive the fluid F from the keyway 148 (shown in FIG. 3).

The lubrication system 108 is in fluid communication with or fluidly coupled to the source 160 of the fluid F via one or more conduits, hydraulic couplings, etc. The lubrication system 108 includes the first shaft bore 122, the cross-bore 150 defined in the rotor segment 118, the lubrication conduit 144 defined in the rotor segment 118 and the sleeve segment 316, the lubrication groove 142 defined in the sleeve segment 316, the sleeve lubrication bore 146 defined in the shaft sleeve 104, the feed groove 154 defined in the rotor segment 118 and the openings 200 of the shaft collar 106.

Generally, the fluid F is supplied by the source 160 to the first shaft bore 122. From the first shaft bore 122, the fluid F flows to the cross-bore 150. From the cross-bore 150, the fluid F flows through the keyway 148 (shown in FIG. 3) to the feed groove 154. From the feed groove 154, the fluid F flows through the openings 200 of the collar to lubricate the bearing coupled to the coupling segment 120.

From the cross-bore 150, the fluid F also flows along the keyway 148 (shown in FIG. 3) and/or lubrication conduit 144 into the portion of the lubrication conduit 144 defined in the sleeve segment 316. The fluid F flows from the lubrication conduit 144 into the lubrication groove 142, and from the lubrication groove 142 into the sleeve lubrication bore 146. From the sleeve lubrication bore 146, the fluid F flows over the outer surface of the body 178 and onto the motor end ring 60 proximate the shaft sleeve 104. By providing the rotor shaft system 300 with the lubrication system 108, the rotor shaft 302 and the electric motor 50 may be lubricated and/or cooled without requiring additional components.

Figure 6:
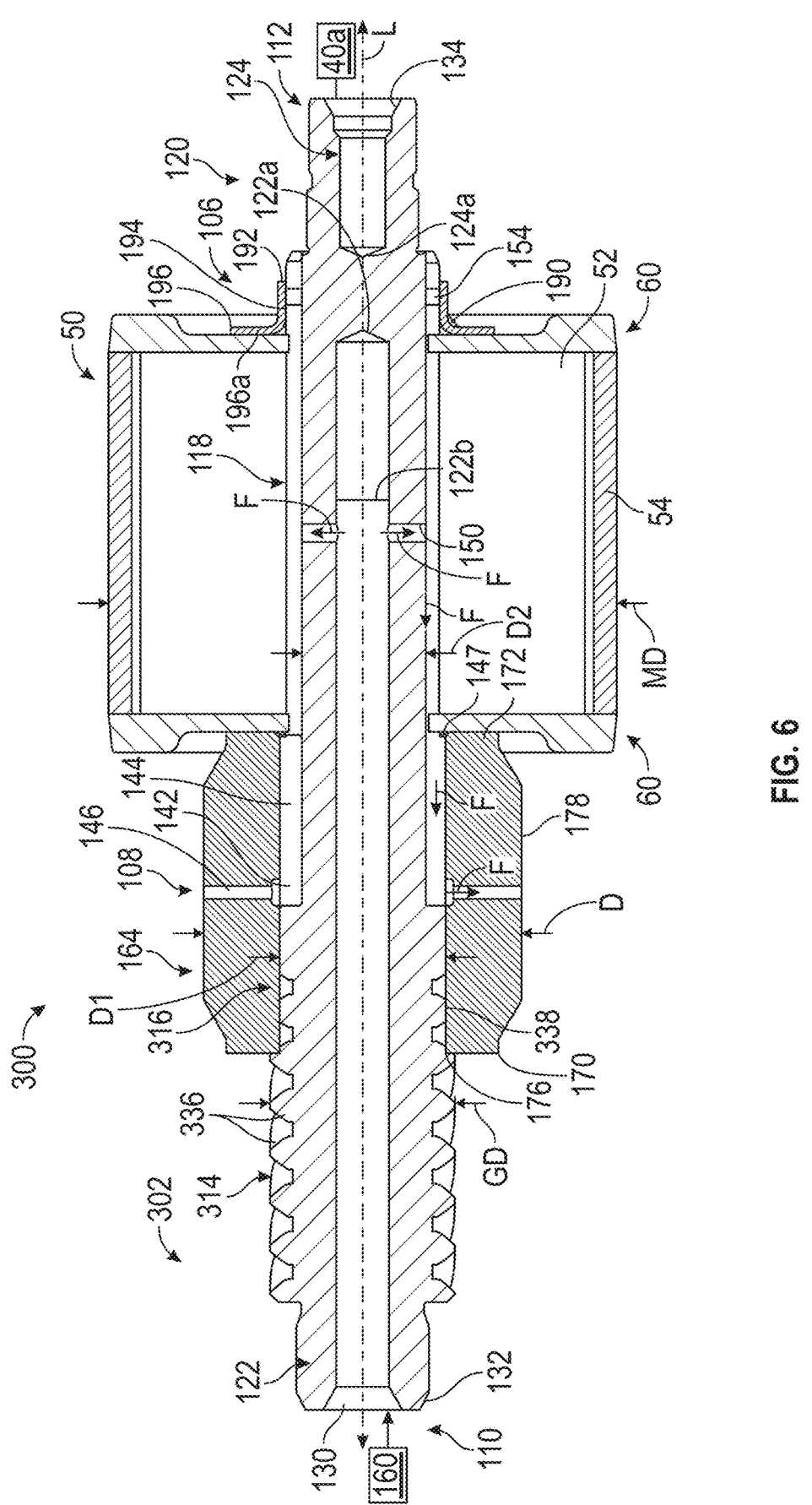
FIG. 6 is a cross-sectional view of another exemplary rotor shaft system and the electric motor, taken from the perspective of line 3-3 of FIG. 2, for use with the vehicle of FIG. 1.

In one example, with reference to FIGS. 3 and 6, in order to assemble the rotor shaft system 100, 300 with the electric motor 50, with the rotor shaft 102, 302 formed, the first shaft bore 122 and the second shaft bore 124 may be drilled or machined in the rotor shaft 102, 302. The cross-bore 150 may be drilled through the rotor segment 118, and the feed groove 154 may be machined through the rotor segment 118. In the example of the rotor shaft 102, the recessed area 138 is defined in the sleeve segment 116. The lubrication groove 142 and the lubrication conduit 144 are defined in the rotor shaft 102, 302, via drilling, machining, etc. The keyway 148 (FIG. 3) is defined, via machining, so as to mate with the key 152 (FIG. 3) of the rotor 52. In the example of the rotor shaft 102, the shaft gear 114 is formed proximate the first shaft end 110, and any debris is removed from the recessed area 138. In the example of the rotor shaft 302, the shaft gear 314 is formed proximate the first shaft end 110 and the sweep out area 338 is defined in the sleeve segment 316 during the formation of the shaft gear 314.

With the shaft sleeve 104 formed, the sleeve lubrication bore 146 is defined through the body 178 of the shaft sleeve 104. The shaft sleeve 104 is pressed or shrink fitted about the sleeve segment 116, 316. With the stator 54 coupled to the rotor 52, and the motor end rings 60 coupled to the stator 54 and the rotor 52, the rotor 52 is slid on to the keyway 148 (FIG. 3) of the rotor segment 118 such that the key 152 (FIG. 3) is received within the keyway 148 (FIG. 3). The dimples 198 of the shaft collar 106 are aligned with the grooves of the motor end ring 60 proximate the second shaft end 112 and the shaft collar 106 is coupled to the rotor shaft 102, 302 to secure the rotor 52 and the shaft sleeve 104 on the rotor shaft 102, 302. By coupling the shaft sleeve 104 over a portion of the gear teeth 136, 336, coupling the rotor 52 to the rotor shaft 102, 302 such that one of the motor end rings 60 engaged with the shaft sleeve 104, and clamping the shaft collar 106 to the other one of the motor end rings 60 with the shaft collar 106, a clamp path for securing the electric motor 50 to the rotor shaft 102, 302 is from the shaft collar 106 through the rotor 52, through the shaft sleeve 104 to the shaft gear 114, 314. Thus, the shaft sleeve 104 is part of the clamp path for coupling the electric motor 50 to the rotor shaft 102, 302.

With the electric motor 50 coupled to the rotor shaft 102, 302, the rotor shaft system 100, 300 and the electric motor 50 may be installed in the vehicle 10. The shaft gear 114, 314 may be coupled to the mating gear of the transmission system 22 to transfer torque from the electric motor 50 to the transmission system 22. The source 160 of the fluid F may be coupled to the rotor shaft 102 via conduits, fittings, etc. to supply the lubrication system 108 with the fluid F.

As the propulsion system 20 operates to supply power to the transmission system 22 to drive the vehicle wheels 16 and/or 18 of the vehicle 10, the rotor 52 rotates the rotor shaft 102, 302. The rotation of the rotor shaft 102, 302 drives the transmission system 22 via the mating gear M coupled to the transmission system 22, which is coupled to the shaft gear 114, 314. The source 160 supplies the fluid F to the lubrication system 108, which cools the rotor shaft 102, 302, the shaft sleeve 104, the motor end rings 60, the shaft collar 106 and the bearing coupled to the rotor shaft 102, 302 at the coupling segment 120. The shaft sleeve 104 increases a lateral stiffness of the rotor shaft 102, 302, which reduces the flexibility of the rotor shaft 102, 302 and ensures alignment between the shaft gear 114, 314 and the mating gear M of the transmission system 22. In this regard, the first diameter and the second diameter of the rotor shaft 102, 302 are relatively small, and along with the first shaft bore 122 and the second shaft bore 124, the rotor shaft 102, 302 is relatively light in weight. By providing the rotor shaft 102, 302 with reduced diameters D1, D2 and weight, the rotor 52 may drive the rotor shaft 102, 302 at a higher speed, and in turn, drive the transmission system 22 at a higher speed. The reduced diameter and light weight of the rotor shaft 102, 302 may increase the flexibility of the rotor shaft 102, 302 but the shaft sleeve 104 increases the lateral stiffness of the rotor shaft 102, 302 without impacting the speed the rotor shaft 102, 302 may be driven. This ensures that the shaft gear 114, 314 remains in a substantially parallel relationship with the mating gear M of the transmission system 22 during operation, and reduces the misalignment line of action between the shaft gear 114 and the mating gear M. The shaft sleeve 104 also reduces a noise and vibration response of the rotor shaft 102, 302, by increasing the stiffness of the rotor shaft 102, 302, which reduces sound transmitted by the operation of the rotor shaft 102, 302. The substantial uniformity in the diameters D1, D2 of the rotor shaft 102, 302 also reduce manufacturing complexity, and the substantially symmetric shape of the shaft sleeve 104 reduces assembly complexity. In addition, by being coupled to and surrounding a portion of the gear teeth 136, 336, the shaft sleeve 104 acts as a part of the shaft gear 114, 314 and is inhibited from moving relative to the shaft gear 114, 314.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor shaft system for a vehicle, comprising:
a rotor shaft including a first shaft end opposite a second shaft end and having a first segment and a second segment defined between the first shaft end and the second shaft end;
a rotor of an electric motor including end rings and disposed on the second segment of the rotor shaft;
a shaft gear coupled to the rotor shaft between the first shaft end and the first segment, wherein the shaft gear is on an opposite side of the first segment from the rotor;
a shaft sleeve coupled on the first segment and surrounding a portion of the shaft gear, the shaft sleeve having a first end and a second end; and
a lubrication system defined at least partially through the rotor shaft and the shaft sleeve, the lubrication system configured to supply a fluid to at least a portion of the rotor shaft and the shaft sleeve,
wherein the shaft sleeve extends over the shaft gear with the first end overlaps and is disposed about the shaft gear,
wherein the second end is disposed in contact with one of the end rings.

2. The rotor shaft system of claim 1, wherein the rotor shaft includes a first shaft bore defined from the first shaft end through the first segment and at least part of the second segment, and the first shaft bore is in fluid communication with the lubrication system.

3. The rotor shaft system of claim 2, wherein the lubrication system includes a cross-bore defined through the second segment in fluid communication with the first shaft bore.

4. The rotor shaft system of claim 3, wherein the second segment includes a keyway defined axially on an outer perimeter of the second segment, and the cross-bore is in fluid communication with the keyway.

5. The rotor shaft system of claim 4, wherein the keyway is configured to couple the rotor shaft to the rotor of the electric motor of the vehicle.

6. The rotor shaft system of claim 4, wherein a lubrication conduit is defined through part of the first segment and the second segment, and is in fluid communication with the keyway.

7. The rotor shaft system of claim 6, wherein the shaft sleeve includes a sleeve lubrication bore in fluid communication with the lubrication conduit.

8. The rotor shaft system of claim 1, wherein:
the end rings include a first end ring and a second end rings,
the first end ring includes a countersunk region with a contact surface facing the shaft sleeve,
the shaft sleeve extends into the countersunk region and contacts the first end ring at the contact surface.

9. The rotor shaft system of claim 1, wherein the first segment has a first diameter that is greater than a second diameter of the second segment.

10. The rotor shaft system of claim 1, further comprising a shaft collar coupled to the second segment proximate the second shaft end.

11. The rotor shaft system of claim 10, wherein:
the second segment includes a feed groove; and
the shaft collar includes at least one opening in fluid communication with the feed groove.

12. A vehicle, comprising:
an electric motor including a rotor with magnetic elements contained between end rings; and
a rotor shaft system coupled to the electric motor, the rotor shaft system including:
a rotor shaft including a first shaft end opposite a second shaft end and having a first segment and a second segment defined between the first shaft end and the second shaft end, the second segment coupled to the rotor, wherein the rotor is disposed on the second segment of the rotor shaft;
a shaft gear defined on the rotor shaft between the first shaft end and the first segment, wherein the shaft gear is on an opposite side of the first segment from the rotor;
a shaft sleeve coupled on the first segment so as to be disposed between the shaft gear and the rotor, and the shaft sleeve surrounding a portion of the shaft gear, the shaft sleeve having a first end and a second end;
a shaft collar coupled to the second segment between the rotor and the second shaft end, and the shaft collar is configured to clamp the rotor and the shaft sleeve to the rotor shaft; and
a lubrication system defined through a portion of the rotor shaft and the shaft sleeve, the lubrication system configured to supply a fluid to at least the portion of the rotor shaft, the shaft sleeve and the electric motor,
wherein the shaft sleeve extends over the shaft gear with the first end overlaps and is disposed about the shaft gear,
wherein the second end is disposed in contact with one of the end rings.

13. The vehicle of claim 12, wherein the rotor shaft includes a first shaft bore defined to extend from the first shaft end through the first segment and at least part of the second segment, and the first shaft bore is in fluid communication with the lubrication system.

14. The vehicle of claim 13, wherein the lubrication system includes a cross-bore defined through the second segment in fluid communication with the first shaft bore.

15. The vehicle of claim 14, wherein the second segment includes a keyway defined axially on an outer perimeter of the second segment, the keyway coupled to a key associated with the rotor, and the cross-bore is in fluid communication with the keyway.

16. The vehicle of claim 15, wherein:

a lubrication conduit is defined through part of the first segment and the second segment, and the lubrication conduit in fluid communication with the keyway; and the shaft sleeve includes a sleeve lubrication bore, and the sleeve lubrication bore is in fluid communication with the lubrication conduit.

17. The vehicle of claim 12, wherein:

the end rings include a first end ring and a second end rings, the first end ring includes a countersunk region with a contact surface facing the shaft sleeve, the shaft sleeve extends into the countersunk region and contacts the first end ring at the contact surface, and the shaft sleeve overlaps and encloses a recessed area defined in the first segment adjacent to the shaft gear.

18. The vehicle of claim 12, wherein the first segment has a first diameter that is greater than a second diameter of the second segment.

19. The vehicle of claim 12, wherein:

the second segment includes a feed groove; and the shaft collar includes at least one opening in fluid communication with the feed groove.

20. The vehicle of claim 12, further comprising a sensor coupled to a second shaft bore at the second shaft end and the second shaft bore extends axially toward the second segment.

* * * * *